Patented Nov. 3, 1942

2,300,566

UNITED STATES PATENT OFFICE 2,300,566

PROCESS OF PREPARING POLYMERIZATION PRODUCTS

Hans-Joachim Hahn and Ernst Braun, Frankfort-on-the-Main, Germany, assignors, by mesne assignments, to General Aniline & Film Corporation, New York, N. Y., a corporation of Delaware No Drawing. Application March 16, 1940, Serial No. 324,374. In Germany March 10, 1939

7 Claims. (Cl. 260—32)

The present invention relates to a process of preparing polymerization products.

Various processes are already known for polymerizing unsaturated organic compounds in an aqueous medium. For the dispersion of the organic compound to be polymerized there are chiefly used soap-like emulsifying agents or water-soluble bodies of a high molecular weight, such as cellulose derivatives, polyacrylates or polyvinyl alcohol. Either stable emulsions or polymerization products are formed which deposit sediments in the aqueous liquor and are obtained, by filtration, in the form of fine-grained or pearl-like solid products.

Now we have found that for the preparation of granular polymerization products of unsaturated polymerizable compounds capable of being filtered there may advantageously be applied aqueous solutions of water-soluble salts of interpolymerization products containing free carboxylic acid groups as dispersing liquor. Particularly suitable for that purpose are the salts of interpolymerization products of polymerizable organic vinyl compounds with unsaturated carboxylic acids not polymerizing as such or at most difficulty capable of being polymerized. In comparison with the known processes the present method of operating involves the advantage of applying the adjuvant in a concentration between 0.01 per cent. and 0.1 per cent. There is thus attained that the finished particle of the polymerization product may contain as small a quantity as possible of the dispersing agent so that the solutions of the separated and dried product in organic solvents are absolutely clear. If the afore-named bodies are applied a very uniform grain size is obtained and if organic peroxides are used as catalysts no portion of the polymeric body emulsified so as to be stable is formed; the yields of solid polymerization product are, therefore, substantially quantitative.

As organic catalysts there may be used benzoyl-peroxide, acetyl-peroxide, stearyl-peroxide, palmityl-peroxide, oleyl-peroxide, chlorbenzoyl-peroxide, toluyl-peroxide, methyl-benzoyl-peroxide or dimethyl-peroxide. Inorganic catalysts, such as potassium-persulfate, sodium-persulfate and hydrogen peroxide when used alone are less suitable than the organic catalysts, but they are very useful when they are applied in combination with the afore-named organic catalysts.

The polymerization is suitably performed in a stirring vessel at a raised temperature.

Pearl-like or fine-grained polymerization products of the following compounds containing the group.

may for instance be prepared: Vinyl-acetate, vinyl-formate, vinyl-propionate, vinyl-butyrate, vinyl-benzoate; acrylic acid methyl-ester, acrylic acid ethyl ester, acrylic acid propyl ester, acrylic acid butyl ester; methacrylic acid methyl ester, methacrylic acid ethyl ester, methacrylic acid propyl ester, methacrylic acid butyl ester; styrene, vinyl-methyl-ketone, vinyl chloride, butadiene, chloroprene; acrylic acid amide, acrylic acid anilide, acrylic acid methyl-amide or acrylic acid nitrile. Two each or more of these compounds in admixture with each other may be polymerized. As carboxylic acids being at most difficulty capable of being polymerized there may, for instance be used: maleic acid, crotonic acid, angelic acid or tiglic acid. The term "interpolymerization products of unsaturated polymerizable compounds with unsaturated carboxylic acids" comprises such products as are formed by the interpolymerization of functional derivatives of the said carboxylic acids and a subsequent transformation of the interpolymerization products thus obtained into compounds with free carboxylic acid groups. Such functional derivatives are, for instance, maleic anhydride, maleic acid methyl ester, maleic acid ethyl ester, maleic acid propyl ester, maleic acid nitrile, crotonic acid methyl ester, crotonic acid ethyl ester or crotonic acid propyl ester. By a subsequent saponification of the interpolymerization products of these compounds with unsaturated polymerizable compounds free carboxylic acid groups may readily be obtained.

As compounds with which the unsaturated carboxylic acids named may be interpolymerized there may be used vinyl-acetate, vinyl-formate, vinyl-propionate, vinyl-butyrate, vinyl-benzoate; acrylic acid methyl ester, acrylic acid ethyl ester, acrylic acid propyl ester, acrylic acid butyl ester; methacrylic acid methyl ester, methacrylic acid ethyl ester, methacrylic acid propyl ester, methacrylic acid butyl ester; styrene; vinyl ethers such as vinyl-propyl ether or vinyl butyl ether. The quantitative proportions of the two interpolymerization components may vary between about mol: mol and about 98 parts by weight of the polymerizable vinyl compound to 2 parts by weight of the carboxylic acid or the functional derivative thereof. The interpolymerization products named above have been described in U. S. Patent No. 2,047,398, U. S. Patent No. 2,263,599 and U. S. Patent No. 2,228,270.

As water-soluble salts of these interpolymerization products there may, for instance, be named the salts of the alkali metals, such as potassium, sodium or lithium, furthermore the salts of ammonium and of organic, basic nitrogen compounds, such as mono-ethyl amine, di-ethyl amine or tri-ethyl amine; mono-methyl amine, di-methyl amine or tri-methyl amine; tri-ethanol amine; cyclo-hexyl amine, pyridine, piperidine or guanidine.

The following examples serve to illustrate the invention, but they are not intended to limit it thereto, the parts being by weight:

(1) 100 parts of an aqueous solution of ammonium salt of 0.02 per cent strength of the interpolymerization product obtained from maleic anhydride and styrene are mixed with 100 parts of vinyl acetate containing 1 part of benzoyl peroxide in the dissolved condition. The mixture thus obtained is heated under reflux in a stirring vessel to 70° C.–80° C. The monomeric ester polymerizes in uniform, small pearls. After about 45 minutes the reaction is complete; the product is then cooled, while stirring, to room temperature. The granular polymerization product may very readily be separated from the aqueous liquor by filtration with suction or centrifugation; it may then be dried on drying hurdles. The yield amounts to 98–99 per cent of the theoretical yield. When dissolved in esters and aromatic hydrocarbons the pearls of polyvinyl acetate which are as clear as glass yield clear, viscous solutions.

(2) 200 parts of water which contains in the dissolved condition 0.06 part of the sodium salt of an interpolymerization product prepared from styrene and maleic anhydride are heated in a reflux condenser, while well stirring, to 100° C.–110° C. together with 200 parts of tyrene and 0.6 part of benzoyl peroxide. After 3 hours the polymerization is complete. The polystyrene is obtained in a uniform granular size in a yield of 99 per cent; it is substantially free from monomeric products. The product is separated from the liquor, dried well and then obtained as a fine-grained polystyrene which may be moulded so as to obtain clear, transparent shaped article.

(3) 0.05 part of the ammonium salt of an interpolymerization product prepared from vinylbutyl ether and maleic anhydride is dissolved in 100 parts of water. 100 parts of methacrylic acid methyl ester and 0.08 part of benzoyl peroxide are added and the mixture is heated to 70° C.–80° C. as described in Example 1. After 45 minutes the polymerization of the ester is complete. 97 per cent. of a coarse-grained product are obtained which possesses the same properties of solubility as a polymethacrylate prepared alone or in a solvent.

(4) 50 parts of an aqueous solution of ammonium salt of 0.075 per cent strength of an interpolymerization product obtained from maleic anhydride and vinyl acetate are mixed with 50 parts of acrylic acid methyl ester and 0.25 part of ortho-chlorobenzoyl peroxide, while stirring and the mixture is heated to 70° C.–80° C. After 30 minutes the monomeric ester has substantially polymerized in a quantitative yield and small pearls are obtained. After a careful drying a product is obtained which possesses the known properties of the polymethacrylic acid methyl ester.

(5) 0.15 part of the sodium salt of an interpolymerization product obtained from vinylbutyl ether and maleic anhydride is dissolved in 250 parts of water. 225 parts of vinyl acetate, 25 parts of maleic acid dimethyl ester and 0.25 part of ortho-methylbenzoyl peroxide are added to the solution, while stirring. The mixture is heated in a reflux condenser to 80° C.–85° C. After 3 hours the polymerization is complete. The interpolymerization product is obtained in a yield of 99 per cent in the form of uniform, large pearls which dissolve in esters and aromatic hydrocarbons to a completely clear solution.

(6) 100 parts of an aqueous solution of ammonium salt of 0.09 per cent strength of an interpolymerization product prepared from 95 parts of vinyl acetate and 5 parts of crotonic acid are heated, while stirring, in a reflux condenser to 80° C.–90° C. together with 95 parts of vinyl acetate, 5 parts of crotonic acid and 0.1 part of 3.6-dimethyl-1-benzoyl peroxide. After about 5 hours the reaction is complete; this is perceptible by the fact that the reflux ceases. A pearl-like interpolymerization product of a high molecular weight is obtained in a substantially quantitative yield. It readily dissolves in aqueous ammonia so that the amomnium salt is obtained which may be used as a dispersing agent in the polymerization in the above described concentration.

We claim:

1. In the process of preparing fine-grained and pearl-like polymerization products the step which comprises polymerizing aqueous dispersions of vinyl acetate in the presence of the ammonium salt of an interpolymerization product of maleic anhyride and styrene said ammonium salt being present in a concentration of from about 0.01 to about 0.1 per cent.

2. In the process of preparing fine-grained and pearl-like polymerization products the step which comprises polymerizing aqueous dispersions of methacrylic acid methyl ester in the presence of the ammonium salt of an interpolymerization product of vinyl butyl ether and maleic anhydride said ammonium salt being present in a concentration of from about 0.01 to about 0.1 per cent.

3. In the process of preparing fine-grained and pearl-like polymerization products the step which comprises polymerizing aqueous dispersions of vinyl acetate in the presence of the ammonium salt of an interpolymerization product of vinyl acetate and crotonic acid said ammonium salt being present in a concentration of from about 0.01 to about 0.1 per cent.

4. In the process of preparing fine-grained and pearl-like polymerization products the step which comprises polymerizing aqueous dispersions of unsaturated polymerizable compounds containing the groups

in the presence of water-soluble salts of interpolymerization products prepared by the interpolymerization of a member of the group consisting of vinyl esters, methacrylic acid esters, styrene and vinyl ethers with a member of the group consisting of maleic anhydride and crotonic acid said water-soluble salts being present in a concentration of from about 0.01 to about 0.1 per cent.

5. In the process of preparing fine-grained and pearl-like polymerization products the step which comprises polymerizing aqueous dispersions of mixtures of unsaturated polymerizable compounds containing the groups

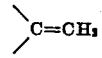

in the presence of water-soluble salts of interpolymerization products prepared by the interpolymerization of a member of the group consisting of vinyl esters, methacrylic acid esters, styrene and vinyl ethers with a member of the group consisting of maleic anhydride and crotonic acid said water-soluble salts being present in a concentration of from about 0.01 to about 0.1 per cent.

6. In the process of preparing fine-grain and pearl-like polymerization products the step which comprises polymerizing aqueous dispersions of unsaturated polymerizable compounds containing the groups

in the presence of water-soluble salts of interpolymerization products of vinyl esters with a member of the group consisting of maleic anhydride and crotonic acid said water-soluble salts being present in a concentration of from about 0.01 to about 0.1 per cent.

7. In the process of preparing fine-grained and pearl-like polymerization products the step which comprises polymerizing aqueous dispersions of unsaturated polymerizable compounds containing the groups

in the presence of water-soluble salts of interpolymerization products prepared by the interpolymerization of a member of the group consisting of vinyl esters, methacrylic acid esters, styrene and vinyl ethers with maleic anhydride said water-soluble salts being present in a concentration of from about 0.01 to about 0.1 per cent.

HANS-JOACHIM HAHN.
ERNST BRAUN.